United States Patent
Zeng et al.

(10) Patent No.: US 11,494,818 B2
(45) Date of Patent: Nov. 8, 2022

(54) NEGOTIATION DEVICE, ESTIMATION METHOD, PROGRAM, AND ESTIMATION DEVICE

(71) Applicant: NEC Corporation, Tokyo (JP)

(72) Inventors: Hongbo Zeng, Tokyo (JP); Shinji Nakadai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/964,432

(22) PCT Filed: Jan. 25, 2018

(86) PCT No.: PCT/JP2018/002328
§ 371 (c)(1),
(2) Date: Jul. 23, 2020

(87) PCT Pub. No.: WO2019/146044
PCT Pub. Date: Aug. 1, 2019

(65) Prior Publication Data
US 2021/0049660 A1    Feb. 18, 2021

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0611* (2013.01); *G06Q 30/0206* (2013.01)

(58) Field of Classification Search
CPC .......... G06Q 30/0611; G06Q 30/0206
See application file for complete search history.

(56) References Cited

U.S. PATENT DOCUMENTS

| 6,401,080 | B1 | 6/2002 | Bigus et al. | |
| 7,373,325 | B1* | 5/2008 | Hadingham | G06Q 30/08 705/35 |
| 2015/0030151 | A1* | 1/2015 | Bellini | H04M 3/5175 379/265.06 |
| 2015/0142482 | A1* | 5/2015 | Canis | G06Q 10/02 705/5 |
| 2020/0020061 | A1* | 1/2020 | Sunder | G06Q 50/188 |

FOREIGN PATENT DOCUMENTS

| JP | H10-269084 A | 10/1998 |
| JP | 2000-035956 A | 2/2000 |

OTHER PUBLICATIONS

Zheng, Xianrong, et al. "Cloud service negotiation in internet of things environment: A mixed approach." IEEE Transactions on Industrial Informatics 10.2 (2014): 1506-1515.*
International Search Report for PCT Application No. PCT/JP2018/002328, dated Apr. 17, 2018.
English translation of Written opinion for PCT Application No. PCT/JP2018/002328, dated Apr. 17, 2018.

(Continued)

*Primary Examiner* — Kathleen Palavecino

(57) ABSTRACT

A negotiation device conducting automated negotiation by transmitting and receiving proposals to and from a counterpart device includes an estimating unit configured to estimate a negotiation characteristic of the counterpart device by using information corresponding to a proposal transmitted by the negotiation device.

7 Claims, 9 Drawing Sheets

(56) References Cited

OTHER PUBLICATIONS

Koen Hindriks, Dmytro Tykhonov "Opponent Modelling in Automated Multi-Issue Negotiation Using Bayesian Learning" Proc. of 7th Int. Conf. on Autonomous Agents and Multiagent Systems (AAMAS 2008), pp. 331-338, Netherlands.

Chongming Hou "Predicting Agents Tactics in Automated Negotiation" Proceedings of the IEEE/WIC/ACM International Conference on Intelligent Agent Technology (IAT) 2004, UK.

Mar. 18, 2015, pp. 1-26, [retrieved on Apr. 4, 2018], Internet:<URL: http://www.airpf.or.jp/kenkyu/26/2609.pdf>, (Fujita, Katsuhide, Artificial Intelligence Research Promotion Foundation), non-official translation (A study on implementation of automatic negotiation protocol for negotiation problems with dependency between issues), Japan.

Mar. 13, 2015, pp. 1-8 (Mori, Akiyuki, Ito, Tkayayuki, A negotiation strategy based on evolutionary stable strategy in bilateral closed bargaining problem, IPSJ SIG Technical Reports, Information Processing Society of Japan.

Nov. 5, 2013, vol. 2013-ICS-172, No. 7, pp. 1-6 (Fujita, Katsuhide, IPSJ SIG Technical Reports), non-official translation (Yasuda, Masanori, Multi-person negotiation support system based on iGA with utility estimation agent introduced), Japan.

Jun. 4, 2013, pp. 1-4, (Morii, Shota, Kawaguchi, Shogo, Ito, Takayuki), non-official translation (Proposal and analysis of agent strategy for multiple issue negotiation problems, prceedings of the 27th National Convention), Japan.

Jun. 4, 2013, vol. 56, No. 10, pp. 1968-1976 (Mori, Akiyuki, Ito, Takayuki, An automated negotiating agent based on the estimated expected utility, Transactions of Information Processing Society of Japan).

Japanese Office Action for JP Application No. 2019-567468 dated May 17, 2022 with English Translation.

* cited by examiner

Fig.3

| PROPOSAL CONTENT | PROPOSAL TIME | RESPONSE |
|---|---|---|
| $\omega_1$ | xx:xx:xx | NO |
| $\omega_2$ | yy:yy:yy | NO |
| ⋮ | ⋮ | ⋮ |
| $\omega_n$ | zz:zz:zzyy | NO |
| ⋮ | ⋮ | ⋮ |

NEGOTIATION DEVICE, ESTIMATION METHOD, PROGRAM, AND ESTIMATION DEVICE

This application is a National Stage Entry of PCT/JP2018/002328 filed on Jan. 25, 2018, the contents of all of which are incorporated herein by reference, in their entirety.

TECHNICAL FIELD

The present invention relates to a negotiation device, an estimation method, a program, and an estimation device.

BACKGROUND ART

There is known an automated negotiation agent technology for conducting negotiations for the purpose of adjusting interests between agents that autonomously operate. Automated negotiation is conducted, for example, under a framework as described below.

In negotiation, one device serving as one agent and the other device serving as the other agent are in a state requiring to select one point from a set $\Omega$ and agree with each other. The devices each have a real-valued function representing the preference for each point of $\Omega$, that is, a "utility function". When the utility function of a certain agent is u, regarding the points $\omega$ and $\omega'$ of $\Omega$, $u(\omega) > u(\omega')$ represents that $\omega$ is more desirable than $\omega'$ for the agent. That is to say, it represents that $\omega$ with a larger value of $u(\omega)$ is more desirable.

Under the above framework, a process of automated negotiation proceeds in a manner as described below, for example.

For example, A firstly proposes a candidate (one point in the set $\Omega$). B can accept or reject the proposed candidate. If B accepts, it is considered that both A and B agree and the negotiation ends. If B does not accept, B proposes another candidate. Then, until A and B reach agreement or until it becomes a predetermined deadline, the same process is repeatedly executed. If it becomes the predetermined deadline before A and B reach agreement, the negotiation breaks down.

For example, assume that A and B negotiate for wine sales. Then, for example, $\Omega$ is the set of growing areas {France, US, Chile}×the set of colors {red, white, rose}×the set of prices {$10, $20, $30, $40, $50} (a direct product set).

In automated negotiation, it is important to know what the other party of the negotiation wants and to what degree the other party may accept. This is because, in order to obtain a desirable result for one party in automated negotiation, it is necessary not only to make a proposal which is desirable for the one party but also to make a proposal which the other party accepts and, for making such a proposal, the above-mentioned information about the other party is useful.

In the above example of wine, it is desirable for the seller to agree on a higher price. However, if the price is too high, the buyer does not accept and the negotiation breaks down. Meanwhile, if the seller knows that the buyer wants red wine, the seller does not need to propose white wine or rose wine, and hence the negotiation can proceed faster.

However, in general, such information about the other party of negotiation is unknown. This is because such information of one party of negotiation is disclosed to the other party, it leads to the fact that the one party is taken unfair advantage of by the other party and there is a high possibility that the negotiation becomes disadvantageous for the one party.

For example, assume that in the case of the above example of wine, the buyer knows that the seller allow price reduction of $30 at the maximum. In this case, the buyer rejects offers of $40 and $50 from the seller. With this, the profit of the seller is more likely to decrease.

Therefore, a technique for estimating such information about the counterpart of negotiation while conducting negotiations or based on the history of past negotiations becomes useful. Various techniques for estimating such information about the counterpart of negotiation have been researched/developed and generally known.

An example of the techniques as described above is described in Non-Patent Document 1, for example. In Non-Patent Document 1, a counterpart agent estimation device is described that includes a data holding part, an estimator, and an estimation result holding part. According to Non-Patent Document 1, the counterpart agent estimation device receives a proposal from a counterpart agent and stores the content and time of the proposal into the data holding part. Then, the counterpart agent estimation device sends the contents and times of counterpart's proposals made thus far from the data holding part to the estimator, and the estimator estimates the utility function of the counterpart agent. After that, the counterpart agent estimation device holds the result of estimation by the estimator in the estimation result holding part.

Further, a similar technique is described in Non-Patent Document 2, for example. In Non-Patent Document 2, a counterpart agent estimation device is described that includes a data holding part, an estimator, and an estimation result holding part. According to Non-Patent Document 2, the counterpart agent estimation device receives a proposal from a negotiation counterpart agent, and stores the content and time of the proposal into the data holding part. Then, the counterpart agent estimation device sends the contents and times of counterpart's proposals made so far from the data holding part to the estimator, and the estimator estimates the threshold function of the counterpart agent. Herein, the threshold function is a function of time showing up to what utility value can be accepted. After that, the counterpart agent estimation device holds the result of estimation by the estimator in the estimation result holding part. In the case of the technique described in Non-Patent Document 2, the utility function of the counterpart is known.

Further, a related technique is described in Patent Document 1, for example. Patent Document 1 describes a method for conducting electronic transactions by a highly functional agent. To be specific, in Patent Document 1, a method is described that includes a step of generating an application for participating in transaction, a step of waiting for a response from a negotiation party, a step of determining whether or not to complete the transaction when receiving the response, and a step of disguising a negotiation tactic from the negotiation party by randomizing at least one attribute of the steps of generating, waiting, and determining.

Patent Document 1: Japanese Unexamined Patent Application Publication No. JP-A 1998-269084

Non-Patent Document 1: Koen Hindriks, Dmytro Tykhonov "Opponent Modelling in Automated Multi-Issue Negotiation Using Bayesian Learning" Proc. of 7th Int. Conf. on Autonomous Agents and Multiagent Systems (AAMAS 2008)

Non-Patent Document 2: Chongming Hou "Predicting Agents Tactics in Automated Negotiation" Proceedings of the IEEE/WIC/ACM International Conference on Intelligent Agent Technology (IAT) 2004

In the case of the techniques described in Non-Patent Document 1 and Non-Patent Document 2, estimation is performed based on a proposal from a counterpart agent. As a result, in the case of the techniques described in Non-Patent Document 1 and Non-Patent Document 2, there is a problem that an inaccurate estimation result is obtained when the counterpart of negotiation provides a disguise such as a randomized proposal as described in Patent Document 1.

SUMMARY

Accordingly, an object of the present invention is to provide a negotiation device, an estimation method, a program, and an estimation device that solve a problem that in estimation of the characteristic of a counterpart agent in automated negotiation, if the counterpart of negotiation provides a disguise, the result of the estimation may become inaccurate.

In order to achieve the object, a negotiation device according to an aspect of the present invention is a negotiation device conducting automated negotiation by transmitting and receiving proposals to and from a counterpart device. The negotiation device includes an estimating unit configured to estimate a negotiation characteristic of the counterpart device by using information corresponding to a proposal transmitted by the negotiation device.

Further, an estimation method according to another aspect of the present invention is an estimation method executed by a negotiation device conducting automated negotiation by transmitting and receiving proposals to and from a counterpart device. The estimation method includes acquiring information corresponding to a proposal transmitted by the negotiation device and estimating a negotiation characteristic of the counterpart device by using the acquired information.

Further, a program according to another aspect of the present invention is a program comprising instructions for causing a negotiation device conducting automated negotiation by transmitting and receiving proposals to and from a counterpart device, to realize an estimating unit configured to estimate a negotiation characteristic of the counterpart device by using information corresponding to a proposal transmitted by the negotiation device.

Further, an estimation device according to another aspect of the present invention is an estimation device applied to a negotiation device conducting automated negotiation by transmitting and receiving proposals to and from a counterpart device. The estimation device is configured to estimate a negotiation characteristic of the counterpart device by using information corresponding to a proposal transmitted by the negotiation device.

With the configurations as described above, the present invention can provide a negotiation device, an estimation method, a program, and an estimation device that solve the problem that in estimation of the characteristic of a counterpart agent in automated negotiation, if the counterpart of negotiation provides a disguise, the result of the estimation may become inaccurate.

BRIEF DESCRIPTION OF DRAWINGS

FIG. 3 is a view showing an example of information stored in a data holding part shown in FIG. 1;

EXAMPLE EMBODIMENTS

First Example Embodiment

Figure 1:
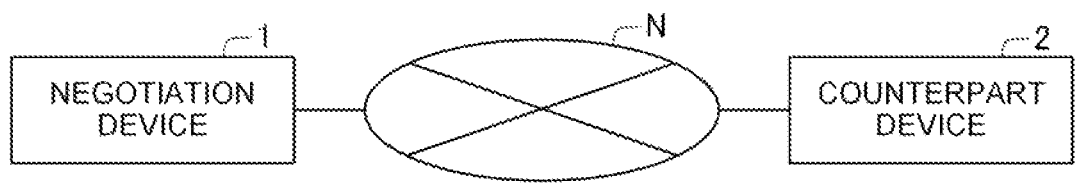
FIG. 1 is a block diagram showing an example of the general configuration of a system according to a first example embodiment of the present invention.
Figure 2:
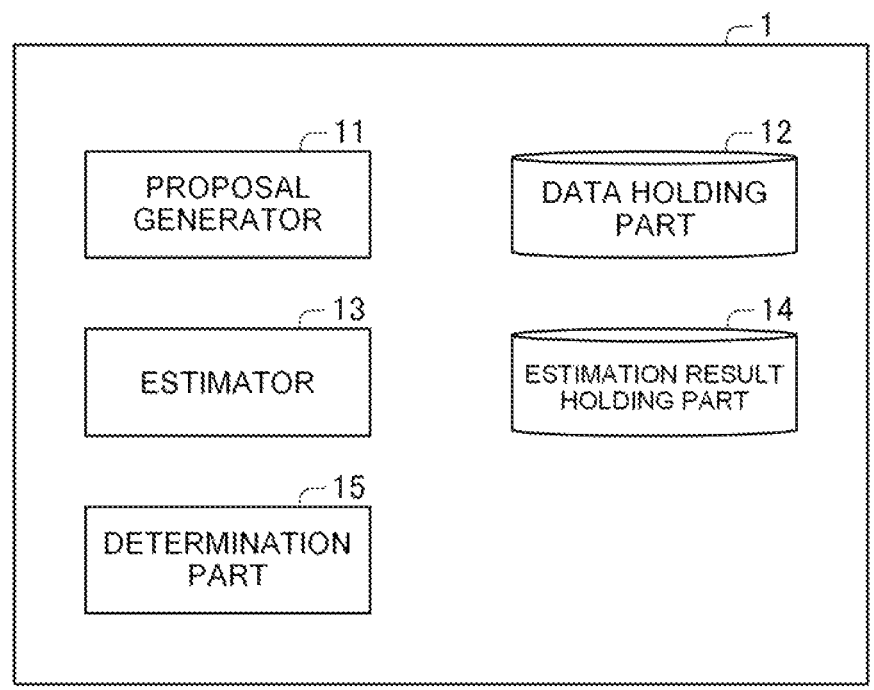
FIG. 2 is a block diagram showing an example of the configuration of a negotiation device shown in FIG. 1.
Figure 4:
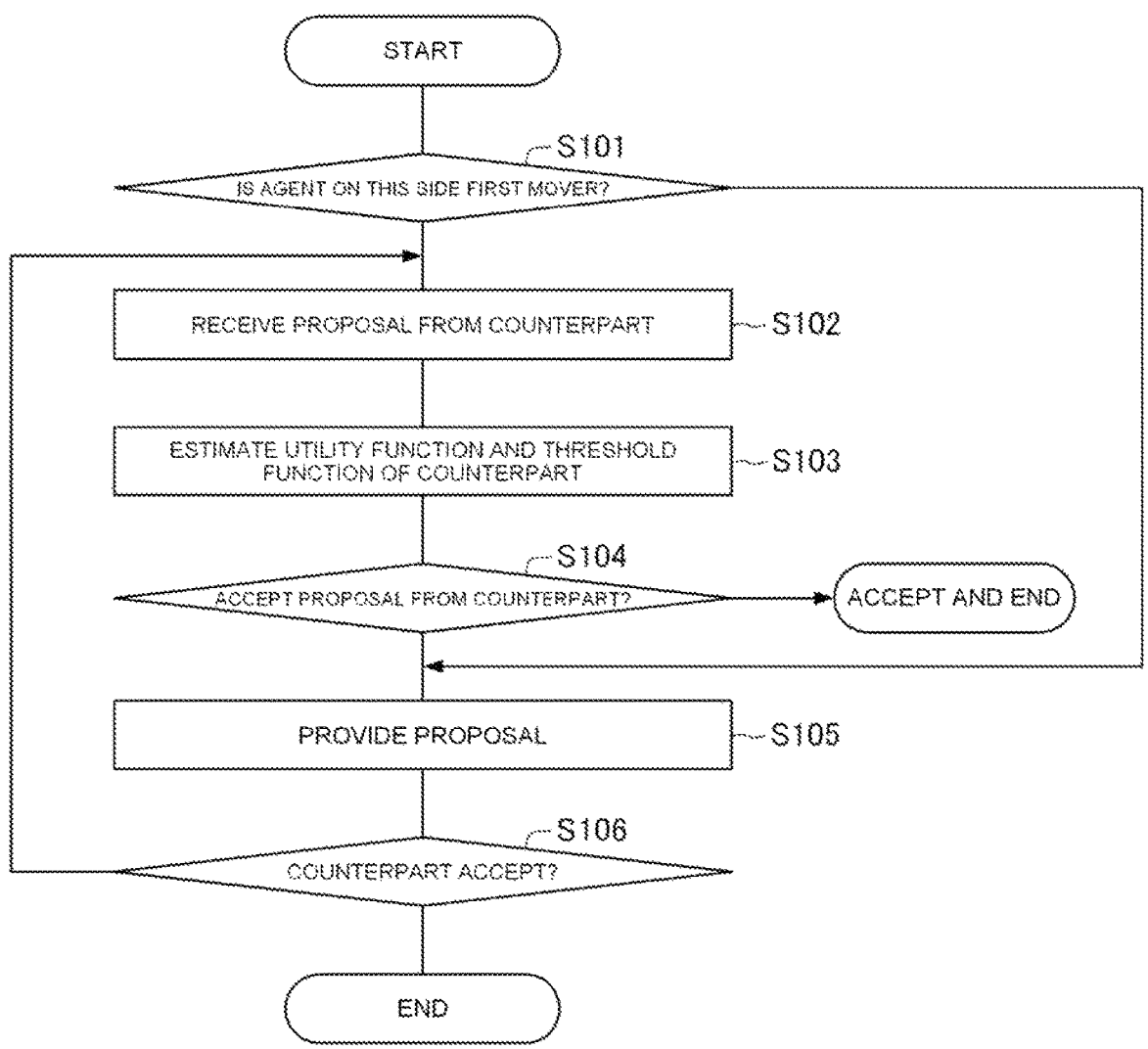
FIG. 4 is a flowchart showing an example of the operation of the negotiation device according to the first example embodiment of the present invention.

A first example embodiment of the present invention will be described with reference to FIGS. 1 to 4. FIG. 1 is a block diagram showing an example of the general configuration of a system which conducts automated negotiation in the first example embodiment. FIG. 2 is a block diagram showing an example of the configuration of a negotiation device 1. FIG. 3 is a view showing an example of information stored in a data holding part 12. FIG. 4 is a flowchart showing an example of the operation of the negotiation device 1.

In the first example embodiment of the present invention, the negotiation device 1 that conducts automated negotiation, which is autonomous negotiation, with a counterpart device 2 will be described. In automated negotiation, negotiations are conducted for the purpose that, for example, the negotiation device 1 and the counterpart device 2 select one point from a set $\Omega$ (for example, the subset of the d-dimensional Euclidean space; may be a set other than the illustrated one) and agree with each other. In automated negotiation, the negotiation device 1 and the counterpart device 2 alternately propose a candidate, which is one point in the set $\Omega$. Automated negotiation takes place until a proposal of one party is accepted by the other party or it becomes a predetermined deadline.

Referring to FIG. 1, the negotiation device 1 is connected to the counterpart device 2 that is the counterpart of negotiation so as to be able to communicate with each other, for example, via a network N or the like. The negotiation device 1 may be connected to a plurality of counterpart devices 2 to as to be able to communicate with each other, for example.

The negotiation device 1 is an information processing device which conducts automated negotiation, which is autonomous negotiation, with the counterpart device 2. The negotiation device 1, for example, transmits a proposal to the counterpart device 2, and determines whether or not to accept a proposal received from the counterpart device 2. Moreover, when conducting automated negotiation, the negotiation device 1 estimates a utility function, a threshold function or the like that is a negotiation characteristic of the counterpart device 2. As will be described later, the negotiation device 1 in this example embodiment uses information corresponding to the content of a proposal from the device when conducting the above estimation. With such a configuration, the negotiation device 1 can perform accurate estimation regardless of a disguise by the counterpart of negotiation.

FIG. 2 shows an example of the configuration of the negotiation device 1. Referring to FIG. 2, the negotiation device 1 has, for example, a proposal generator 11, a data holding part 12, an estimator 13 (an estimating unit, an estimation device), an estimation result holding part 14, and a determination part 15.

The negotiation device 1 has, for example, an arithmetic logic unit such as a CPU that is not shown in the drawing, and a storage unit. For example, the negotiation device 1 realizes the abovementioned processing parts including the proposal generator 11, the estimator 13 and the determination part 15 by the arithmetic logic unit executing a program included by the storage unit that is not shown in the drawing. Alternatively, the negotiation device 1 realizes the abovementioned processing parts, for example, by a logic circuit or the like.

The proposal generator 11 generates a proposal that becomes a candidate for concluding negotiations. For example, in a case where negotiations for the purpose of selecting one point from a set Ω and agreeing with each other are conducted, the proposal generator 11 generates a proposal indicating a candidate that is one point in the set Ω.

The proposal generator 11 generates a new proposal when the negotiation device 1 becomes a first mover that makes a proposal earlier than the counterpart device 2 or when the determination part 15 determines to reject a proposal received from the counterpart device 2. For example, the proposal generator 11 generates a proposal by using the utility function of the negotiation device 1 stored in the negotiation device 1. Moreover, when generating a proposal, the proposal generator 11 can use information stored in the data holding part 12 and information stored in the estimation result holding part 14, which will be described later.

For example, the proposal generator 11 selects a proposal content $\omega_0$ that maximizes the utility function of the negotiation device 1 from the set of proposal contents ω and proposal times t that can be accepted by the counterpart device 2, based on information stored in the estimation result holding part 14 to be described later. Then, the proposal generator 11 generates a proposal indicating a proposal content (for example, a value larger than $\omega_0$) estimated to be not accepted by the counterpart device 2, until the time that the counterpart device 2 is estimated to accept the proposal content $\omega_0$. The proposal generator 11 generates a proposal indicating the proposal content $\omega_0$ when it is the time that the counterpart device 2 is estimated to accept the proposal content $\omega_0$.

The proposal generator 11 generates a proposal in the above manner, for example. The proposal generator 11 may be configured to generate a proposal by a method other than the illustrated one. For example, the proposal generator 11 may be configured to provide a disguise such as a randomized proposal.

When the proposal generator 11 generates a proposal, the negotiation device 1 transmits the proposal generated by the proposal generator 11 to the counterpart device 2. Moreover, the negotiation device 1 stores a proposal content that is the content of the transmitted proposal together with the time when the proposal has been transmitted to the counterpart device 2 into the data holding part 12.

Further, after the negotiation device 1 transmits the proposal to the counterpart device 2, the negotiation device 1 receives a response indicating whether to accept or reject the transmitted proposal from the counterpart device 2. Then, the negotiation device 1 stores the received response into the data holding part 12 in association with the proposal content and proposal time having been already stored.

In this example embodiment, a method for selecting a first mover or a second mover is not specifically limited. The negotiation device 1 and the counterpart device 2 can select a first mover or a second mover by various methods.

The data holding part 12 is a storage device such as a memory. In the data holding part 12, information corresponding to the content of a proposal from the negotiation device 1 is stored. Information stored in the data holding part 12 can be used by the proposal generator 11, the estimator 13, and so on.

FIG. 3 shows an example of information stored in the data holding part 12. Referring to FIG. 3, information in which proposal content "ω", proposal time "t", and response "r" are associated is stored in the data holding part 12. In other words, information showing a proposal from the negotiation device 1 and a response from the counterpart device 2 corresponding to the proposal is stored in the data holding part 12. For example, on the first line in FIG. 3, proposal content "ω1", proposal time "XXXX/XX/XX, xx:xx:xx", and response "NO" are associated. That is to say, the first line in FIG. 3 indicates that a proposal with proposal content "ω1" transmitted at proposal time "XXXX(year)/XX(month)/XX(day), xx(hour)/xx(minute)/xx(second)" has been "rejected (NO)" by the counterpart device 2.

As stated above, proposal content and proposal time of information stored in the data holding part 12 are stored when the negotiation device 1 transmits a proposal to the counterpart device 2. Response is stored when the negotiation device 1 receives a reply to the proposal from the counterpart device 2.

FIG. 3 shows an example of the information stored in the data holding part 12. The information stored in the data holding part 12 is not limited to the case shown in FIG. 3. For example, the data holding part 12 may be configured to hold information in which proposal content and proposal time are associated. In other words, the data holding part 12 may not hold response.

The estimator 13 performs estimation about the counterpart device 2 by using the information stored in the data holding part 12. In other words, the estimator 13 performs estimation about the counterpart device 2 by using information corresponding to the content of a proposal from the negotiation device 1. For example, the estimator 13 retrieves information showing proposal content "ω", proposal time "t", and response "r" of a past proposal from the negotiation device 1 stored in the data holding part 12. Then, the estimator 13 estimates the utility function and threshold function of the counterpart by using the retrieved information.

The utility function refers to a real-valued function representing the preference for each point in a set ω. The utility function is, for example, previously held by the counterpart device 2. For example, when the utility function is u, regarding points ω and ω' of the set Ω, u(ω)>u(ω') represents that ω is more desirable than ω' for the agent. That is to say, the utility function is a function representing that ω with a larger value of u(ω) is more desirable. The utility function is, for example, a linear function.

Further, the threshold function refers to a function of time representing up to what utility value can be accepted. The threshold function is, for example, previously held by the counterpart device 2. If the value (utility) of a proposal received from the negotiation device 1 is equal to or more than the value of the threshold function at that time (for example, the time when the proposal is received), the counterpart device 2 accepts the received proposal.

In this example embodiment, the estimator 13 performs estimation by using, for example, linear logistic regression. For example, the estimator 13 stipulates that a logistic sigmoid function σ is $$\sigma(a) := 1/(1+e(-a)).$$

Then, the estimator 13 calculates a for proposal content ω and time t as follows, and substitutes it into σ.

$$a(\omega, t) = w\hat{}T\omega + c\_0 + c\_1*t + \ldots + c\_n*t\hat{}n$$

In the above, w and c_0, c_1 ... c_n are parameters and are determined (learned) based on data. For example, the estimator 13 learns the above parameters based on all the data obtained thus far in negotiations with the counterpart device 2 that is the same negotiation counterpart. Here, in logistic regression, data with a label is used as a model for learning. In the case of the estimator 13 described in this example embodiment, response "r" received from the counterpart device 2 for input data (proposal content "ω" and proposal time "t") corresponds to the label. The data used for learning by the estimator 13 may be data obtained in the current negotiation or data obtained in the past negotiations including the current one.

In the above description, it is assumed that ω is a point in the d-dimensional Euclidean space and w is a d-dimensional real vector as well. It is also assumed that the ω dependence is w^T ω (this assumption corresponds to the abovementioned "linear").

When learning is completed, it becomes possible to calculate the values of a and σ(a) for a newly given set of proposal content and time (hereinafter referred to as a "test data point") by using the obtained parameter values. In logistic regression, the value of σ(a) for a given test data point is usually regarded as the probability that the test data point is a positive example.

Therefore, the estimator 13 realizes output of the abovementioned utility function and threshold function by outputting the value of the set of parameters (w, c_0, ... c_n). In this case, the utility function is determined to be $u(\omega) = w\hat{}T \omega$, and the threshold function is determined to be $uth(t) = c\_0 - c\_1*t - \ldots - c\_n*t\hat{}n$. From the definition of a, u and uth, when u(ω)>uth(t), a>0 holds up and the acceptance probability (σ(a)) exceeds ½.

For example, through the process as described above, the estimator 13 estimates the utility function and threshold function of the counterpart by using information corresponding to the content of a proposal from the negotiation device 1. Then, the estimator 13 stores the result of estimation into the estimation result holding part 14.

The estimation result holding part 14 is a storage device such as a memory. In the estimation result holding part 14, information showing the result of estimation by the estimator 13 is stored. The information stored in the estimation result holding part 14 can be used by the proposal generator 11, the determination part 15, and so on.

The determination part 15, when receiving a proposal from the counterpart device 2, determines whether to accept or reject the received proposal. For example, the determination part 15 determines whether to accept or reject a proposal received from the counterpart device 2 by using the result of estimation by the estimator 13 stored in the estimation result holding part 14.

For example, the determination part 15 selects proposal content $\omega_0$ that maximizes the utility function of the negotiation device 1 from the set of proposal content ω and proposal time t that can be accepted by the counterpart device 2, based on the information stored in the estimation result holding part 14. Then, in the case of receiving a proposal indicating a utility function value that is equal to or more than proposal content $\omega_0$ from the counterpart device 2, the determination part 15 determines to accept the proposal. On the other hand, in the case of receiving a proposal indicating a utility function value that is less than proposal content $\omega_0$, the determination part 15 determines to reject the proposal.

The determination part 15 may perform the determination by a method other than the method illustrated above. For example, the determination part 15 has a threshold function and can use the threshold function when performing the determination. Moreover, for example, the determination part 15 can determine whether to accept or reject a proposal based on the utility function and threshold function stored in the estimation result holding part 14. The determination part 15 may determine whether to accept or reject a proposal based on a predetermined threshold, the utility function, and the threshold function. The determination part 15 may be configured to perform the determination by any other known method.

The above is an example of the configuration of the negotiation device 1.

The counterpart device 2 is an information processing device which conducts automated negotiation, which is autonomous negotiation, with the negotiation device 1 by transmitting a proposal to the negotiation device 1, and receiving a proposal from the negotiation device 1 and determining whether to accept or reject the received proposal. In this example embodiment, the configuration of the counterpart device 2 is not specifically limited. The counterpart device 2 may be an information processing device having the same configuration as the negotiation device 1, or may be an information processing device having a different configuration.

Next, an example of the operation of the negotiation device 1 will be described with reference to FIG. 4. FIG. 4 is a flowchart showing an example of the operation of the negotiation device 1. Referring to FIG. 4, in a case where the negotiation device 1 serving as an agent on this side is a second mover (step S101, No), the negotiation device 1 waits for a proposal from the counterpart device 2.

The negotiation device 1 receives a proposal from the counterpart device 2 (step 102).

The estimator 13 refers to the data holding part 12 and retrieves information showing the proposal content and proposal time of a proposal made by the negotiation device 1 in the past and a response to the proposal from the counterpart device 2. Then, the estimator 13 estimates a utility function and a threshold function by using the retrieved information (step S103). After that, the estimator 13 stores the result of estimation into the estimation result holding part 14.

The determination part 15 determines whether to accept or reject the proposal received from the counterpart device 2 (step S104). The determination part 15 can determine whether to accept or reject the proposal from the counterpart by using the information stored in the estimation result holding part 14.

In a case where the negotiation device 1 accepts the proposal received from the counterpart device 2 (step S104, Yes), the negotiation ends. On the other hand, in a case where the negotiation device 1 rejects the proposal received from the counterpart device 2 (step S104, No), the proposal generator 11 generates a new proposal. Then, the negotiation device 1 provides the new proposal to the counterpart device 2 (step S105). At this time, the negotiation device 1 stores the proposal content and proposal time of its proposal into the data holding part 12.

In a case where the counterpart device 2 accepts the proposal (step S106, Yes), the negotiation ends, and the negotiation device 1 stores a response showing that the proposal is accepted into the data holding part 12. On the other hand, in a case where the counterpart device 2 rejects the proposal (step S106, No), the negotiation device 1 stores a response showing that the proposal is rejected into the data holding part 12. Moreover, the negotiation device 1 receives a proposal from the counterpart device 2 (step S102). After that, the same procedure is repeated until it becomes a deadline.

In a case where the negotiation device 1 is a first mover, the procedure starts from the processing at step S105. After that, the procedure is the same as the procedure described above.

The above is an example of the operation of the negotiation device 1.

As described above, the negotiation device 1 in this example embodiment includes the data holding part 12 and the estimator 13. With such a configuration, the estimator 13 can perform estimation about the counterpart device 2 based on information corresponding to the content of a proposal from the negotiation device 1 stored in the data holding part 12. As a result, even if the counterpart device 2 makes any disguise such as randomization of a proposal content, the estimator 13 can perform more accurate estimation. This is because the estimator 13 is configured to perform the estimation based on a proposal from the negotiation device 1 and a received response whether or not the proposal is accepted, instead of the content of a proposal from the counterpart. In other words, according to this example embodiment, it becomes possible to provide the negotiation device 1 improved so as to be able to perform more accurate estimation regardless of the presence/absence of a disguise made by the counterpart device 2.

Further, the estimator 13 in this example embodiment is configured to output both a utility function and a threshold function. With such a configuration, the negotiation device 1 can acquire more detailed information on the counterpart device 2. With this, it becomes possible to make the accuracy of determination by the determination part 15 higher. Moreover, when generating a proposal, the proposal generator 11 can use both the utility function and the threshold function.

Information stored in the data holding part 12 and the estimation result holding part 14 may be kept stored even after one negotiation ends. Information stored in the data holding part 12 and the estimation result holding part 14 can be used in the next negotiation with the same counterpart device 2.

Second Example Embodiment

Figure 5:
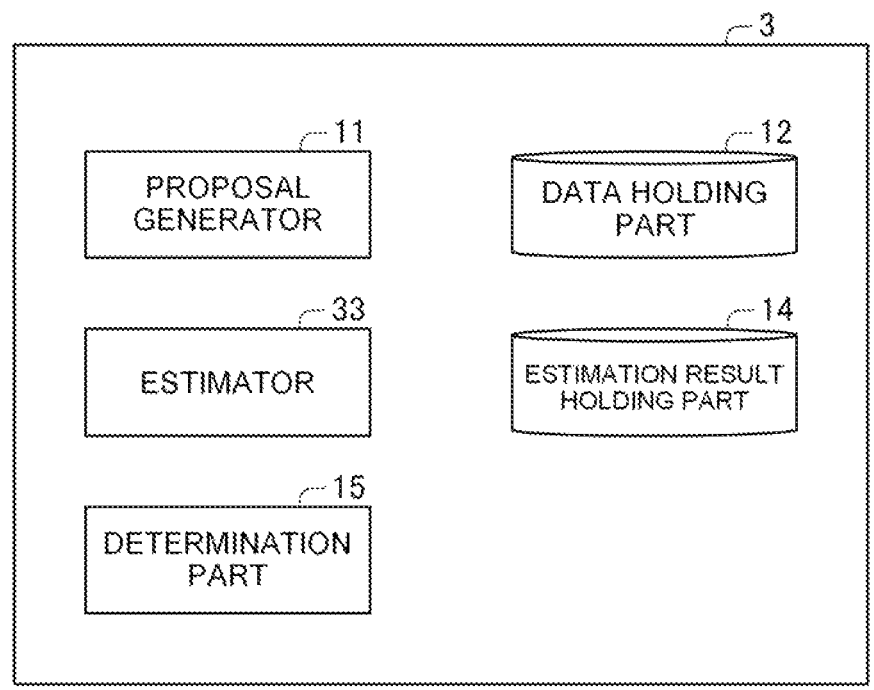
FIG. 5 is a block diagram showing an example of the configuration of a negotiation device according to a second example embodiment of the present invention.
Figure 6:
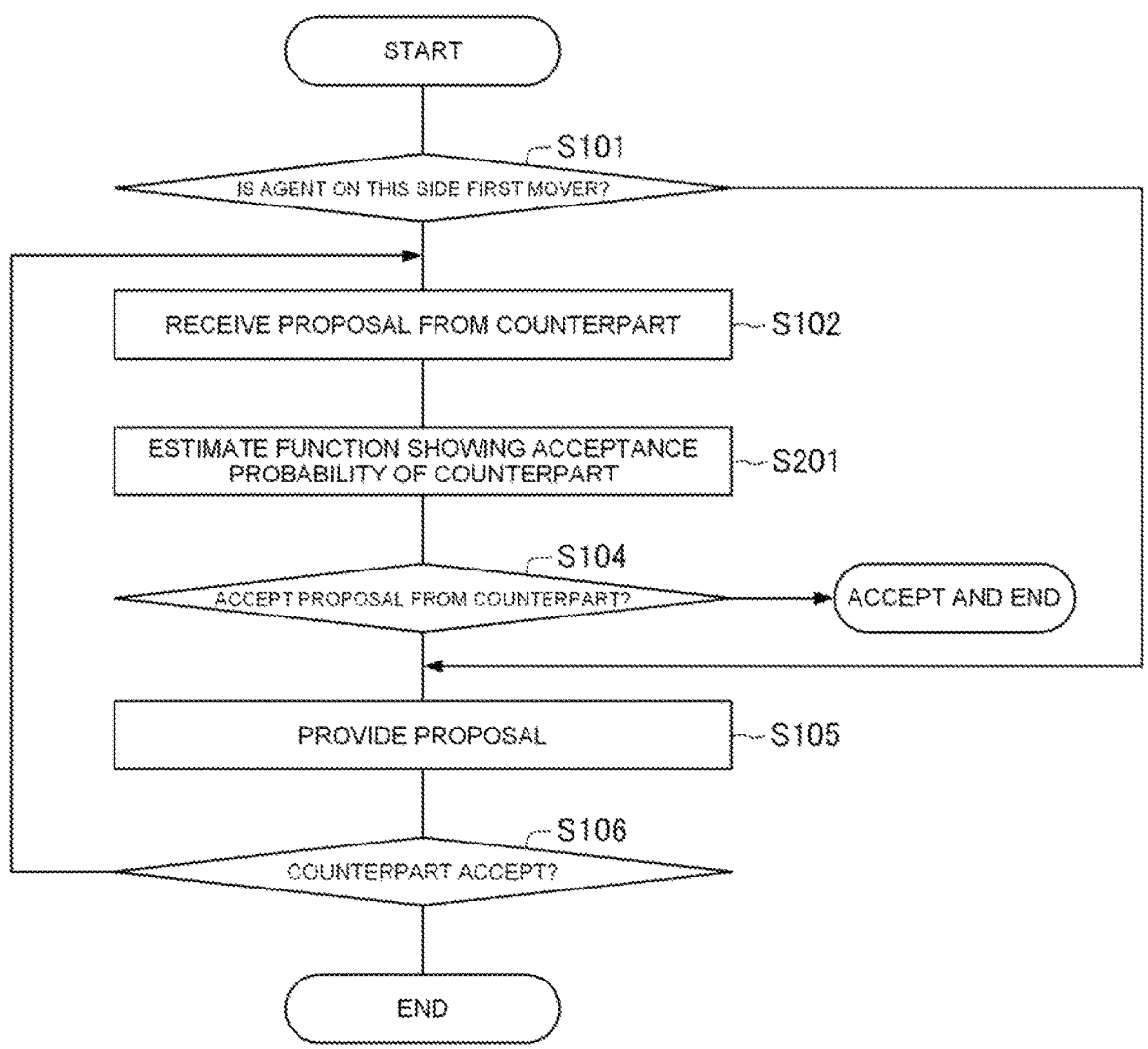
FIG. 6 is a flowchart showing an example of the operation of the negotiation device according to the second example embodiment of the present invention.

Next, referring to FIGS. 5 and 6, a second example embodiment of the present invention will be descried. In the second example embodiment of the present invention, a negotiation device 3 that is a modification example of the negotiation device 1 described in the first example embodiment will be described. The negotiation device 3 in this example embodiment, when conducting automated negotiation, estimates a negotiation characteristic of the counterpart device 2, which is different from the characteristic estimated by the negotiation device 1. For example, the negotiation device 3 is connected to the counterpart device 2 via the network N so as to be able to communicate in the same manner as the negotiation device 1.

FIG. 5 is a block diagram showing an example of the configuration of the negotiation device 3. Referring to FIG. 5, the negotiation device 3 has an estimator 33 instead of the estimator 13 included by the negotiation device 1. Below, a configuration which is characteristic to this example embodiment will be described.

The estimator 33 performs estimation about the counterpart device 2 by using information stored in the data holding part 12 in the same manner as the estimation device 13. In other words, the estimator 33 performs estimation about the counterpart device 2 by using information corresponding to the content of a proposal from the negotiation device 3. For example, the estimator 33 retrieves information stored in the data holding part 12, showing the proposal content and proposal time of a past proposal from the negotiation device 3 and a response thereto. Then, the estimator 33 estimates a function showing the acceptance probability of the counterpart by using the retrieved information. The function showing the acceptance probability of the counterpart is a function of proposal content and proposal time, and shows the acceptance probability of the counterpart.

For example, the estimator 33 performs estimation by executing the same processing as in the estimation using linear logistic regression described in the first example embodiment. Moreover, the output of the estimator 33 can be realized by the estimator 33 outputting the value of the set of parameters (w, c_0, ... c_n) and σ(a(•)) ("•" represents that (ω, t) should be substituted for •).

In this manner, the same input is performed for the estimator 33 as for the estimator 13. Meanwhile, the estimator 33 can output information which is different from that of the estimator 13.

The estimator 33 may output a function showing the acceptance probability by performing classification using a Gaussian process capable of outputting a function showing the acceptance probability.

Next, an example of the operation of the negotiation device 3 will be described with reference to FIG. 6. FIG. 6 is a flowchart showing an example of the operation of the negotiation device 3. Referring to FIG. 6, instead of performing the processing at step S103, the negotiation device 3 estimates a function showing the acceptance probability of the counterpart (step S201). The processing before step S201 and the processing after step S201 are the same as described in the first example embodiment. Therefore, a detailed description thereof will be omitted.

As described above, the negotiation device 3 in this example embodiment includes the estimator 33. With such a configuration, the estimator 33 can estimate a function showing the acceptance probability of the counterpart based on information corresponding to the content of a proposal from the negotiation device 3 stored in the data holding part 12. As a result, even if the counterpart device 2 has made any disguise such as randomization of the proposal content, the estimator 33 can perform more accurate estimation. This is because the estimator 33 is configured to perform the estimation by accepting a proposal by the negotiation device 3 and whether to accept or not in response to the proposal, instead of the content of a proposal from the counterpart.

Further the estimator 33 in this example embodiment is configured to output a function showing the acceptance probability of the counterpart. With such a configuration, the negotiation device 3 can acquire more detailed information on the counterpart device 2. Consequently, for example, the negotiation device 3 can determine what content and time of a proposal is likely to be accepted more. The result of estimation by the estimator 33 can be used, for example, when the proposal generator 11 generates a proposal.

Third Example Embodiment

Next, referring to FIGS. 7 and 8, a third example embodiment of the present invention will be described. In the third example embodiment of the present invention, a negotiation device 4 that is a modification example of the negotiation device 1 described in the first example embodiment and the negotiation device 3 described in the second example embodiment will be described. When conducting automated negotiation, the negotiation device 4 in this example embodiment estimates a negotiation characteristic of the counterpart device 2, which is different from those estimated by the negotiation device 1 and the negotiation device 3. For example, the negotiation device 4 is connected to the counterpart device 2 via the network N so as to be able to communicate in the same manner as the negotiation device 1 and the negotiation device 3.

Figure 7:
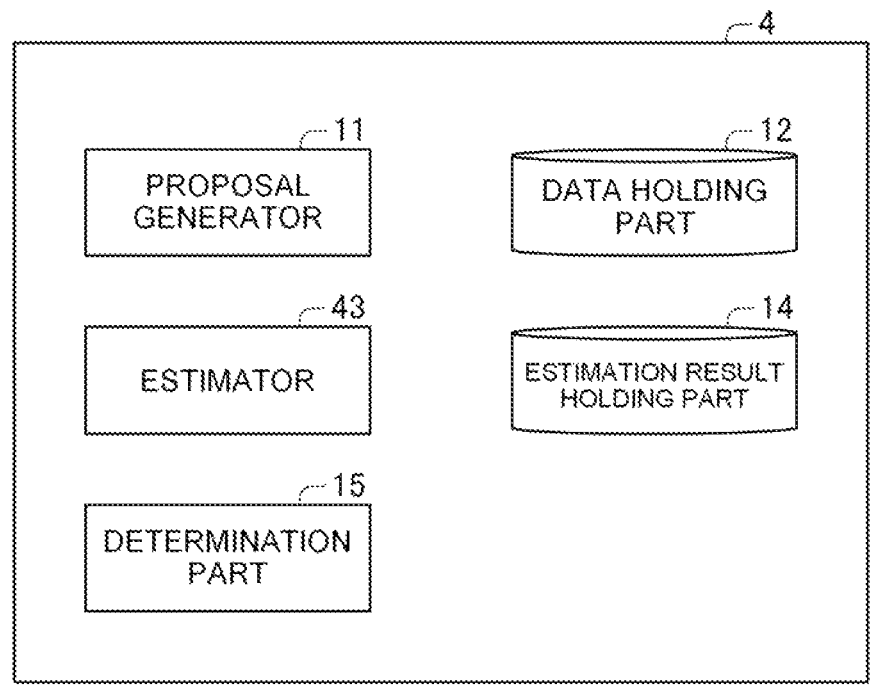
FIG. 7 is a block diagram showing an example of the configuration of a negotiation device according to a third example embodiment of the present invention.
Figure 8:
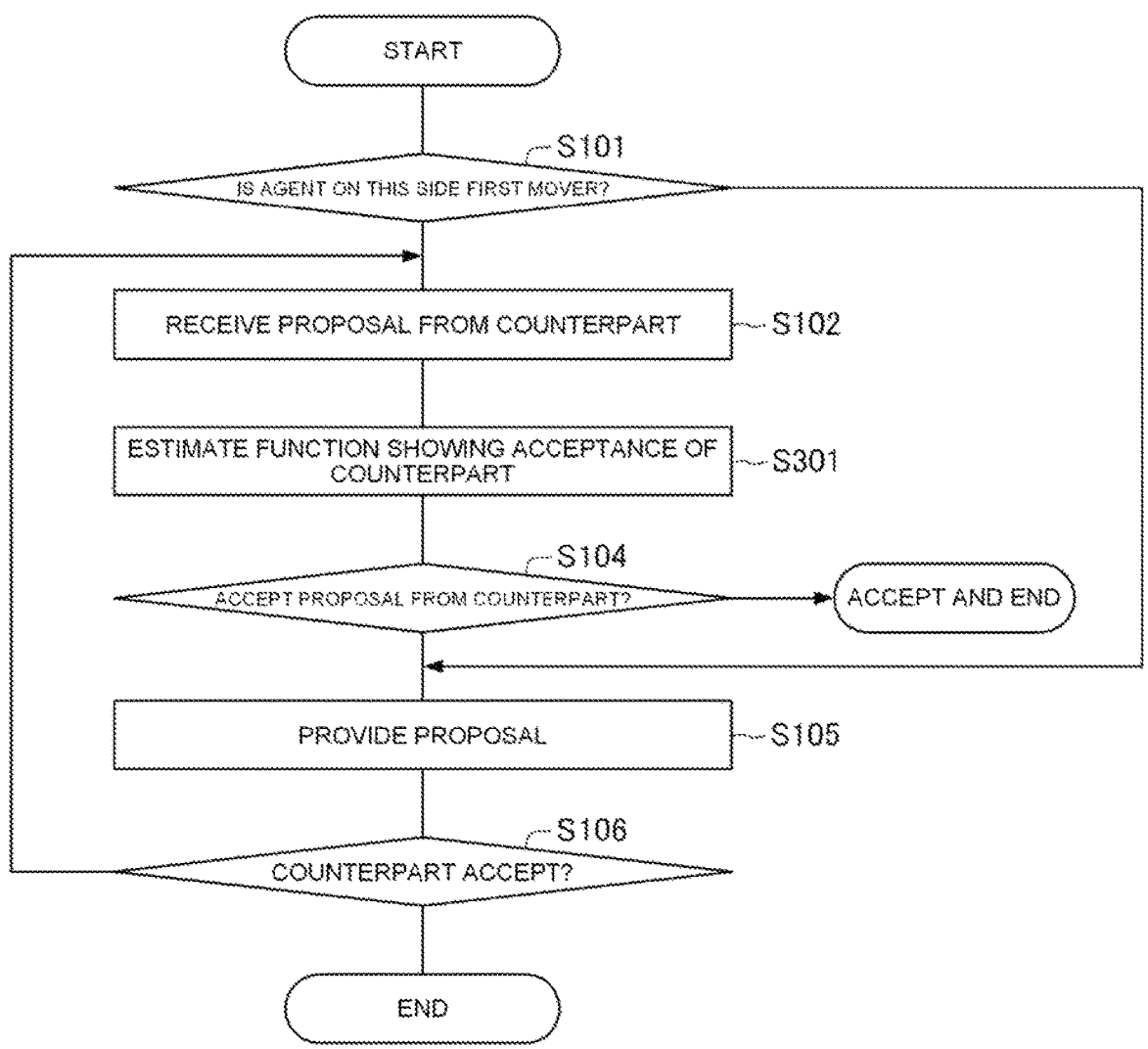
FIG. 8 is a flowchart showing an example of the operation of the negotiation device according to the third example embodiment of the present invention.

FIG. 7 is a block diagram showing an example of the configuration of the negotiation device 4. Referring to FIG. 7, the negotiation device 4 includes an estimator 43 instead of the estimator 13 included by the negotiation device 1. Below, a configuration which is characteristic to this example embodiment will be described.

The estimator 43 performs estimation about the counterpart device 2 by using information stored in the data holding part 12 in the same manner as the estimator 13 and the estimator 33. In other words, the estimator 43 performs estimation about the counterpart device 2 by using information corresponding to the content of a proposal from the negotiation device 4. For example, the estimator 43 retrieves information stored in the data holding part 12 that shows the proposal content and proposal time of a past proposal from the negotiation device 4 and a response thereto. Then, the estimator 43 estimates a function showing whether or not the counterpart accepts the proposal by using the retrieved information. The function showing whether or not the counterpart accepts the proposal is, for example, a binary function of proposal content and proposal time.

For example, the estimator 43 performs the estimation by performing the same processing as the estimation using the linear logistic regression described in the first example embodiment. The estimator 43 outputs the value of the set of parameters and $s(\sigma(a(\bullet)))$ for $s(x)=1$ (if $x>0$) OR 0 (if $x<=0$). For example, with such processing, the estimator 43 can output a function showing whether or not the counterpart accepts the proposal ("•" represents that $(\omega, t)$ should be substituted for "•").

Thus, the same input is performed for the estimator 43 as that for the estimator 13. On the other hand, the estimator 43 can output information which is different from that of the estimator 13.

The estimator 43 may be realized by performing classification using a Gaussian process. Moreover, the estimator 43 may be realized by classification using a support vector machine, which is one of pattern recognition models.

Next, an example of the operation of the negotiation device 4 will be described with reference to FIG. 8. FIG. 8 is a flowchart showing an example of the operation of the negotiation device 4. Referring to FIG. 8, instead of performing the processing at step S103 and step S201, the negotiation device 4 estimates a function showing whether or not the counterpart accepts (step S301). The processing before step S301 and the processing after step S301 are the same as those described in the first example embodiment and the second example embodiment. Therefore, a detailed description thereof will be omitted.

As described above, the negotiation device 4 in this example embodiment includes the estimator 43. With such a configuration, the estimator 43 can estimate a function showing whether or not the counterpart accepts based on information corresponding to the content of a proposal from the negotiation device 4 that is stored in the data holding part 12. As a result, even if the counterpart device 2 has made any disguise such as randomization of proposal content, the estimator 43 can perform more accurate estimation. This is because the estimator 43 is configured to perform estimation by receiving a proposal of the negotiation device 4 and whether or not to accept the proposal, instead of the content of a proposal from the counterpart.

Further, the estimator 43 in this example embodiment is configured to output a function showing whether or not the counterpart accepts. With such a configuration, the negotiation device 4 can acquire more detailed information about the counterpart device 2. Consequently, the negotiation device 4 can determine, for example, what kind and time of proposal is likely to be accepted more. The result of estimation by the estimator 43 can be used, for example, when the proposal generator 11 generates a proposal.

Fourth Example Embodiment

Figure 9:
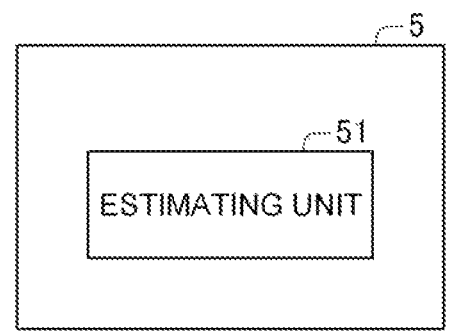
FIG. 9 is a block diagram showing an example of the configuration of a negotiation device according to a fourth example embodiment of the present invention.

Next, with reference to FIG. 9, a fourth example embodiment of the present invention will be described. In the fourth example embodiment of the present invention, a negotiation device 5 will be described.

The negotiation device 5 conducts automated negotiation by transmitting and receiving proposals to and from the counterpart device. FIG. 9 shows an example of the configuration of the negotiation device 5. Referring to FIG. 9, the negotiation device 5 includes an estimating unit 51.

The negotiation device 5 includes, for example, an arithmetic logic device such as a CPU that is not shown in the drawing and a storage device. For example, the negotiation device 5 realizes the abovementioned estimating unit 51 by the arithmetic device executing a program stored in the storage device that is not shown in the drawing. Alternatively, the negotiation device 5 realizes the abovementioned estimating unit 51, for example, by a logic circuit or the like.

The estimating unit 51 estimates a negotiation characteristic of the counterpart device by using information corresponding to a proposal transmitted by the negotiation device 5.

Thus, the negotiation device 5 includes the estimating unit 51. With such a configuration, the estimating unit 51 can estimate a negotiation characteristic of the counterpart device by using information corresponding to a proposal transmitted by the negotiation device 5. As a result, even if the counterpart device has made any disguise such as randomization of proposal content, the estimating unit 51 can perform more accurate estimation. This is because the estimating unit 51 is configured to estimate based on the content of a proposal of the negotiation device 5, instead of the content of a proposal of the counterpart.

Further, the negotiation device 5 described above can be realized by incorporating a predetermined program in the negotiation device 5. To be specific, a program according to another aspect of the present invention is a program for realizing, in a negotiation device that conducts automated negotiation by transmitting and receiving proposals to and from a counterpart device, an estimating unit that estimates a negotiation characteristic of the counterpart device by using information corresponding to a proposal transmitted by the negotiation device.

Further, an estimation method executed by the negotiation device 5 described above is a method by which a negotiation device that conducts automated negotiation by transmitting and receiving proposals to and from a counterpart device retrieves information corresponding to a proposal transmitted by the negotiation device and, by using the retrieved information, estimates a negotiation characteristic of the counterpart device.

Since the invention of a program or an estimation method having the abovementioned configuration has the same action as the negotiation device 5, it can achieve the object of the present invention stated above. Moreover, since an estimation device including a function as the estimating unit 51 also has the same action, it can achieve the object of the present invention.

<Supplementary Notes>

The whole or part of the example embodiments disclosed above can be described as the following supplementary notes. Below, the outline of the negotiation device and so on of the present invention will be described. However, the present invention will not be limited to the following configurations.

(Supplementary Note 1)

A negotiation device conducting automated negotiation by transmitting and receiving proposals to and from a counterpart device, the negotiation device comprising an estimating unit configured to estimate a negotiation characteristic of the counterpart device by using information corresponding to a proposal transmitted by the negotiation device.

(Supplementary Note 2)

The negotiation device according to Supplementary Note 1, wherein the estimating unit is configured to estimate the negotiation characteristic of the counterpart device by using the information corresponding to the proposal transmitted by the negotiation device, the information including a proposal content showing a content of the proposal transmitted by the negotiation device and proposal time showing time of the proposal.

(Supplementary Note 3)

The negotiation device according to Supplementary Note 1 or 2, wherein the estimating unit is configured to estimate the negotiation characteristic of the counterpart device by using the information corresponding to the proposal transmitted by the negotiation device, the information including a response from the counterpart device corresponding to the proposal transmitted by the negotiation device.

(Supplementary Note 4)

The negotiation device according to any of Supplementary Notes 1 to 3, wherein the estimating unit is configured to estimate a utility function and a threshold function by using the information corresponding to the proposal transmitted by the negotiation device, the utility function being a real-valued function showing preference for each point in a set, the threshold function being a function of time showing a value which can be accepted by the counterpart device.

(Supplementary Note 5)

The negotiation device according to any of Supplementary Notes 1 to 4, wherein the estimating unit is configured to, by using the information corresponding to the proposal transmitted by the negotiation device, estimate a function showing probability that the counterpart device accepts the proposal.

(Supplementary Note 6)

The negotiation device according to any of Supplementary Notes 1 to 5, wherein the estimating unit is configured to, by using the information corresponding to the proposal transmitted by the negotiation device, estimate a function showing whether or not the counterpart device accepts the proposal.

(Supplementary Note 7)

An estimation method executed by a negotiation device conducting automated negotiation by transmitting and receiving proposals to and from a counterpart device, the estimation method comprising acquiring information corresponding to a proposal transmitted by the negotiation device and estimating a negotiation characteristic of the counterpart device by using the acquired information.

(Supplementary Note 8)

The estimation method according to Supplementary Note 7, comprising estimating the negotiation characteristic of the counterpart device by using the information corresponding to the proposal transmitted by the negotiation device, the information including a proposal content showing a content of the proposal transmitted by the negotiation device and proposal time showing time of the proposal.

(Supplementary Note 9)

A program comprising instructions for causing a negotiation device conducting automated negotiation by transmitting and receiving proposals to and from a counterpart device, to realize an estimating unit configured to estimate a negotiation characteristic of the counterpart device by using information corresponding to a proposal transmitted by the negotiation device.

(Supplementary Note 10)

An estimation device applied to a negotiation device conducting automated negotiation by transmitting and receiving proposals to and from a counterpart device, the estimation device being configured to estimate a negotiation characteristic of the counterpart device by using information corresponding to a proposal transmitted by the negotiation device.

The program described in the respective example embodiments and supplementary notes described above are stored in a storage device or recorded on a computer-readable recording medium. For example, the recording medium is a portable medium such as a flexible disk, an optical disk, a magnetooptical disk, and a semiconductor memory.

Although the present invention has been described above with reference to the respective example embodiments, the present invention is not limited to the example embodiments. The configurations and details of the present invention can be changed in various manners that can be understood by one skilled in the art within the scope of the present invention.

DESCRIPTION OF NUMERALS 1 negotiation device
11 proposal generator
12 data holding part
13 estimator
14 estimation result holding part 15 determination part
2 counterpart device
3 negotiation device
31 estimator
4 negotiation device
41 estimator
5 negotiation device
51 estimating unit

What is claimed is:

1. A negotiation device conducting automated negotiation by transmitting and receiving proposals to and from a counterpart device, the negotiation device comprising:
- a storage device configured to store, in the storage device, a proposal content and proposal time of a proposal transmitted by the negotiation device when transmitting the proposal by the negotiation device, and when receiving a response to the proposal from the counterpart device, store the received response in association with the proposal content and the proposal time of the proposal;
- an estimating unit configured to estimate a negotiation characteristic of the counterpart device by performing supervised classification by using the proposal content and the proposal time of the proposal and the response stored in the storage device, the supervised classification using the proposal content and the proposal time of the proposal transmitted by the negotiation device as input data and using the response as a label, the negotiation characteristic representing a utility function in the counterpart device and a value which can be accepted by the counterpart device; and
- a determination unit configured to determine whether to accept or reject the proposal received from the counterpart device, on a basis of a result of estimation by the estimating unit.

2. The negotiation device according to claim 1, wherein the estimating unit is configured to estimate the negotiation characteristic of the counterpart device by using the information corresponding to the proposal transmitted by the negotiation device, the information including the proposal content showing a content of the proposal transmitted by the negotiation device and the proposal time showing time of the proposal.

3. The negotiation device according to claim 1, wherein the estimating unit is configured to, by using the information corresponding to the proposal transmitted by the negotiation device, estimate a function showing probability that the counterpart device accepts the proposal.

4. The negotiation device according to claim 1, wherein the estimating unit is configured to, by using the information corresponding to the proposal transmitted by the negotiation device, estimate a function showing whether or not the counterpart device accepts the proposal.

5. An estimation method executed by a negotiation device conducting automated negotiation by transmitting and receiving proposals to and from a counterpart device, the estimation method comprising:
- storing, in a storage device, a proposal content and proposal time of a proposal transmitted by the negotiation device when transmitting the proposal by the negotiation device, and when receiving a response to the proposal from the counterpart device, storing the received response in association with the proposal content and the proposal time of the proposal;
- estimating a negotiation characteristic of the counterpart device by performing supervised classification by using the proposal content and the proposal time of the proposal and the response stored in the storage device, the supervised classification using the proposal content and the proposal time of the proposal transmitted by the negotiation device as input data and using the response as a label, the negotiation characteristic representing a utility function in the counterpart device and a value which can be accepted by the counterpart device;
- determining whether to accept or reject the proposal received from the counterpart device, on a basis of a result of estimation.

6. The estimation method according to claim 5, wherein the negotiation characteristic of the counterpart device is estimated by using the information corresponding to the proposal transmitted by the negotiation device, the information including the proposal content showing a content of the proposal transmitted by the negotiation device and the proposal time showing time of the proposal.

7. A non-transitory computer-readable medium having a program recorded thereon, the program comprising instructions executable by a negotiation device conducting automated negotiation by transmitting and receiving proposals to and from a counterpart device, the instructions executable to perform processing comprising: storing, in a storage device, a proposal content and proposal time of a proposal transmitted by the negotiation device when transmitting the proposal by the negotiation device, and when receiving a response to the proposal from the counterpart device, storing the received response in association with the proposal content and the proposal time of the proposal;
- estimating a negotiation characteristic of the counterpart device by performing supervised classification by using the proposal content and the proposal time of the proposal and the response stored in the storage device, the supervised classification using the proposal content and the proposal time of the proposal transmitted by the negotiation device as input data and using the response as a label, the negotiation characteristic representing a utility function in the counterpart device and a value which can be accepted by the counterpart device;
- determining whether to accept or reject the proposal received from the counterpart device, on a basis of a result of estimation.

* * * * *